United States Patent
Kirchner et al.

(10) Patent No.: US 8,334,046 B2
(45) Date of Patent: *Dec. 18, 2012

(54) OVERMOLDED POLYAMIDE COMPOSITE STRUCTURES AND PROCESSES FOR THEIR PREPARATION

(75) Inventors: Olaf Norbert Kirchner, Genolier (CH); Martyn Douglas Wakeman, Gland (CH); Andri E. Elia, Chadds Ford, PA (US)

(73) Assignee: E I du Pont de Nemours and Company, Wilmington, DE (US)

(*) Notice: Subject to any disclaimer, the term of this patent is extended or adjusted under 35 U.S.C. 154(b) by 336 days.

This patent is subject to a terminal disclaimer.

(21) Appl. No.: 12/775,575

(22) Filed: May 7, 2010

(65) Prior Publication Data

US 2010/0291819 A1 Nov. 18, 2010

Related U.S. Application Data

(60) Provisional application No. 61/177,366, filed on May 12, 2009.

(51) Int. Cl.
| | |
|---|---|
| *B32B 5/02* | (2006.01) |
| *B32B 9/00* | (2006.01) |
| *B32B 9/04* | (2006.01) |
| *A01K 1/015* | (2006.01) |
| *B29C 67/00* | (2006.01) |
| *B28B 11/18* | (2006.01) |

(52) U.S. Cl. .......... 428/297.1; 428/297.4; 428/221; 442/64; 442/59; 442/152; 442/180; 442/179; 442/169; 264/136; 264/165; 264/255; 264/257

(58) Field of Classification Search .......... None
See application file for complete search history.

(56) References Cited

U.S. PATENT DOCUMENTS

| | | | |
|---|---|---|---|
| 4,255,219 A | 3/1981 | Dellavecchia | |
| 4,466,138 A | 8/1984 | Gessalin | |
| 5,418,301 A | 5/1995 | Hult | |
| 6,225,404 B1 | 5/2001 | Sorensen | |
| 6,497,959 B1 | 12/2002 | Mhetar | |
| 6,663,966 B2 | 12/2003 | Mhetar | |
| 6,722,392 B1 | 4/2004 | David | |
| 2005/0009976 A1* | 1/2005 | Akkapeddi et al. | 524/445 |
| 2007/0173617 A1 | 7/2007 | Eipper | |
| 2008/0008879 A1* | 1/2008 | Elia et al. | 428/339 |
| 2009/0004477 A1 | 1/2009 | Malle | |
| 2010/0291821 A1* | 11/2010 | Kirchner et al. | 442/152 |

FOREIGN PATENT DOCUMENTS

| | | |
|---|---|---|
| EP | 0 142 360 | 5/1988 |
| EP | 2 070 680 | 12/2007 |
| FR | 0 042 782 | 6/1981 |
| FR | 2813508 | 3/2002 |
| WO | 01/60592 | 8/2001 |
| WO | 03/004546 | 1/2003 |
| WO | 2004/111126 | 12/2004 |
| WO | 2007/149300 | 12/2007 |

* cited by examiner

*Primary Examiner* — Jennifer Chriss
*Assistant Examiner* — Camie Thompson

(57) ABSTRACT

The present invention relates to the field of overmolded polyamide composites structures and processes for their preparation. The disclosed overmolded composite structures comprise a first component having a surface, which surface has at least a portion made of a surface polyamide resin composition, and having a fibrous material impregnated with a matrix resin composition, and comprise a second component comprising an overmolding resin composition. The second component is adhered to the first component over at least a portion of the surface of said first component. One of the overmolding resin composition and the surface polyamide resin composition is made of a polyamide composition comprising a blend of one or more semi-aromatic polyamides (A) and one or more fully aliphatic polyamides (B) and the other of the overmolding resin composition and the surface polyamide resin composition is made of one or more polyamides.

11 Claims, No Drawings

OVERMOLDED POLYAMIDE COMPOSITE STRUCTURES AND PROCESSES FOR THEIR PREPARATION

CROSS REFERENCE TO RELATED APPLICATIONS

This application claims the benefit of U.S. Provisional Application No. 61/177,366, filed May 12, 2009, now pending, the entire disclosure of which is incorporated herein by reference.

FIELD OF THE INVENTION

The present invention relates to the field of overmolded polyamide composite structures, and processes for their preparation.

BACKGROUND OF THE INVENTION

With the aim of replacing metal parts for weight saving and cost reduction while having comparable or superior mechanical performance, structures based on composite materials comprising a polymer matrix containing a fibrous material have been developed. With this growing interest, fiber reinforced plastic composite structures have been designed because of their excellent physical properties resulting from the combination of the fibrous material and the polymer matrix and are used in various end-use applications. Manufacturing techniques have been developed for improving the impregnation of the fibrous material with a polymer matrix to optimize the properties of the composite structure. In highly demanding applications, such as for example structural parts in automotive and aerospace applications, composite materials are desired due to a unique combination of lightweight, high strength and temperature resistance.

High performance composite structures can be obtained using thermosetting resins or thermoplastic resins as the polymer matrix. Thermoplastic-based composite structures present several advantages over thermoset-based composite structures such as, for example, the fact that they can be post-formed or reprocessed by the application of heat and pressure, that a reduced time is needed to make the composite structures because no curing step is required, and their increased potential for recycling. Indeed, the time consuming chemical reaction of cross-linking for thermosetting resins (curing) is not required during the processing of thermoplastics. Among thermoplastic resins, polyamides are particularly well suited for manufacturing composite structures. Thermoplastic polyamide compositions are desirable for use in a wide range of applications including parts used in automobiles, electrical/electronic parts, household appliances and furniture because of their good mechanical properties, heat resistance, impact resistance and chemical resistance and because they may be conveniently and flexibly molded into a variety of articles of varying degrees of complexity and intricacy.

U.S. Pat. No. 4,255,219 discloses a thermoplastic sheet material useful in forming composites. The disclosed thermoplastic sheet material is made of polyamide 6 and a dibasic carboxylic acid or anhydride or esters thereof and at least one reinforcing mat of long glass fibers encased within said layer. However, composites made from polyamide 6 may show a loss of their mechanical properties over a typical end-use application temperature range, such as for example from a low temperature (e.g. −40° C.) to a high temperature (e.g. +120° C.).

For making integrated composite structures and to increase the performance of polymers, it is often desired to "overmold" one or more parts made of a polymer onto a portion or all of the surfaces of a composite structure so as to surround or encapsulate said surfaces. Overmolding involves shaping a second polymer part directly onto one or more surfaces of the composite structure, to form a two-part composite structure, wherein the two parts are adhered one to the other at least at one interface. Adhesion between the overmolded polymer and the surface of the composite structure is due to compatibility of the overmolded polymer and the surface of the composite structure. The polymer compositions used to impregnate the fibrous material (i.e. the matrix polymer composition) and the polymer compositions used to overmold the impregnated fibrous material (i.e. the overmolding polymer composition) are desired to have good adhesion, extremely good dimensional stability and retain their mechanical properties under adverse conditions, including thermal cycling, so that the composite structure is protected under operating conditions and thus has an increased lifetime. Examples of polyamides used to impregnate a fibrous layer and to overmold the impregnated layer are semi-aromatic polyamides. WO 2007/149300 discloses a semi-aromatic polyamide composite article comprising a component comprising a fiber-reinforced material comprising a polyamide composition, an overmolded component comprising a polyamide composition, and an optional tie layer therebetween, wherein at least one of the polyamide compositions is a semi-aromatic polyamide composition. The disclosed structures are said to exhibit physical properties that render them suitable for use as replacements for metal components in various applications. Unfortunately, conventional polyamide compositions that are used to impregnate one or more fibrous reinforcement layers and to overmold the one or more impregnated fibrous layers may show poor adhesion between the overmolded polymer and the surface of the component comprising the fiber-reinforced material. The poor adhesion may result in the formation of cracks at the interface of the overmolded pieces leading to reduced mechanical properties, premature aging and problems related to delamination and deterioration of the article upon use and time.

There is a need for an overmolded composite structure having a good adhesion between the surface of the composite and an overmolding resin.

SUMMARY OF THE INVENTION

It has been surprisingly found that the above mentioned problems can be overcome by an overmolded composite structure comprising i) a first component having a surface, which surface has at least a portion made of a surface polyamide resin composition, and comprising a fibrous material selected from non-woven structures, textiles, fibrous battings and combinations thereof, said fibrous material being impregnated with a matrix resin composition, and ii) a second component comprising an overmolding resin composition,
  wherein one of the overmolding resin composition and the
    surface polyamide resin composition is made of a polyamide composition comprising a blend of a) one or more semi-aromatic polyamides (A) containing repeat units derived from aromatic dicarboxylic acids and aliphatic diamines, and b) one or more fully aliphatic polyamides (B) selected from the group consisting of polyamides containing repeat units derived from aliphatic dicarboxylic acids and aliphatic diamines, polyamides containing repeat units derived from aliphatic aminocarboxylic acids, and polyamides derived from lactams, wherein the other of the overmolding resin composition and the surface polyamide resin composition is made of one or more polyamides, and wherein said second component is adhered to said first component over at least a portion of the surface of said first component.

Described herein are processes for making the overmolded composite structure described herein. The processes for making the overmolding composite structures described above comprise a step of overmolding the first component described herein with an overmolding resin composition.

The overmolded composite structures described herein exhibit a good adhesion when a part made of an overmolding resin composition is adhered on the surface of the composite structure. The good adhesion between the first component, i.e. the composite structure, and the overmolding resin leads to structures exhibiting a good resistance against the deterioration or the delamination of the structure upon use and time.

DETAILED DESCRIPTION

Several patents and publications are cited in this description. The entire disclosure of each of these patents and publications is incorporated herein by reference.

The present invention relates to overmolded composite structures and processes to make them. The overmolded composite structure according to the present invention comprises at least two components, i.e. a first component and a second component. The first component consists of a composite structure having a surface, which surface has at least a portion made of a surface polyamide resin composition, and comprises a fibrous material selected from non-woven structures, textiles, fibrous battings and combinations thereof, said fibrous material being impregnated with a matrix resin composition.

The overmolded composite structure may comprise more than one first components, i.e. it may comprise more than one composite structures and may comprise more than one second components.

The second component is adhered to the first component over at least a portion of the surface of said first component, the portion of the surface being made of the surface polyamide resin composition described herein. The first component may be fully or partially encapsulated by the second component.

For purposes herein, "a fibrous material being impregnated with a matrix resin composition" means that the matrix resin composition encapsulates and embeds the fibrous material so as to form an interpenetrating network of fibrous material substantially surrounded by the matrix resin composition. For purposes herein, the term "fiber" is defined as a, macroscopically homogeneous body having a high ratio of length to width across its cross-sectional area perpendicular to its length. The fiber cross section can be any shape, but is typically round.

The fibrous material may be in any suitable form known to those skilled in the art and is preferably selected from non-woven structures, textiles, fibrous battings and combinations thereof. Non-woven structures can be selected from random fiber orientation or aligned fibrous structures. Examples of random fiber orientation include without limitation chopped and continuous material which can be in the form of a mat, a needled mat or a felt. Examples of aligned fibrous structures include without limitation unidirectional fiber strands, bidirectional strands, multidirectional strands, multi-axial textiles. Textiles can be selected from woven forms, knits, braids and combination thereof. The fibrous material can be continuous or discontinuous in form.

Depending on the end-use application of the overmolded composite structure and the required mechanical properties, more than one fibrous materials can be used, either by using several same fibrous materials or a combination of different fibrous materials, i.e. the first component described herein may comprise one or more fibrous materials. An example of a combination of different fibrous materials is a combination comprising a non-woven structure such as for example a planar random mat which is placed as a central layer and one or more woven continuous fibrous materials that are placed as outside layers. Such a combination allows an improvement of the processing and thereof of the homogeneity of the first component thus leading to improved mechanical properties of the overmolded composite structure. The fibrous material may be made of any suitable material or a mixture of materials provided that the material or the mixture of materials withstand the processing conditions used during the impregnation by the matrix resin composition and the surface polyamide resin composition and during the overmolding of the first component by the overmolding resin composition.

Preferably, the fibrous material comprises glass fibers, carbon fibers, aramid fibers, graphite fibers, metal fibers, ceramic fibers, natural fibers or mixtures thereof; more preferably, the fibrous material comprises glass fibers, carbon fibers, aramid fibers, natural fibers or mixtures thereof; and still more preferably, the fibrous material comprises glass fibers, carbon fibers and aramid fibers or mixture mixtures thereof. By natural fiber, it is meant any of material of plant origin or of animal origin. When used, the natural fibers are preferably derived from vegetable sources such as for example from seed hair (e.g. cotton), stem plants (e.g. hemp, flax, bamboo; both bast and core fibers), leaf plants (e.g. sisal and abaca), agricultural fibers (e.g., cereal straw, corn cobs, rice hulls and coconut hair) or lignocellulosic fiber (e.g. wood, wood fibers, wood flour, paper and wood-related materials). As mentioned above, more than one fibrous materials can be used. A combination of fibrous materials made of different fibers can be used such as for example a first component comprising one or more central layers made of glass fibers or natural fibers and one or more surface layers made of carbon fibers or glass fibers. Preferably, the fibrous material is selected from woven structures, non-woven structures or combinations thereof, wherein said structures are made of glass fibers and wherein the glass fibers are E-glass filaments with a diameter between 8 and 30 μm and preferably with a diameter between 10 to 24 μm.

The fibrous material may further comprise a thermoplastic material, for example the fibrous material may be in the form of commingled or co-woven yarns or a fibrous material impregnated with a powder made of a thermoplastic material that is suited to subsequent processing into woven or non-woven forms, or a mixture for use as a uni-directional material.

Preferably, the ratio between the fibrous material and the polymer materials in the first component (i.e. in the composite structure), i.e. the fibrous material in combination with the matrix resin composition and the surface resin composition, is at least 30% fibrous material and more preferably between 40 and 60% fibrous material, the percentage being a volume-percentage based on the total volume of the first component, i.e. the composite structure.

One of the overmolding resin composition and the surface polyamide resin composition is made of a polyamide composition comprising a blend of a) one or more semi-aromatic polyamides (A) and b) one or more fully aliphatic polyamides (B); and the other of the overmolding resin composition and the surface polyamide resin composition is made of one or more polyamides.

Preferably, the polyamide composition described herein comprises a blend of a) one or more semi-aromatic polyamides (A) and b) one or more one or more fully aliphatic polyamides (B) in a weight ratio (A:B) from about 99:1 to about 5:95, more preferably from about 97:3 to about 50:50.

Described herein are overmolded composites comprising an overmolding resin composition made of the polyamide composition comprising the blend of a) one or more semi-aromatic polyamides (A) and b) one or more fully aliphatic polyamides (B) described herein and a surface polyamide resin composition made of one or more polyamides, preferably semi-aromatic polyamides.

Also described herein are overmolded composite comprising a surface resin composition made of the polyamide composition comprising the blend of a) one or more semi-aromatic polyamides (A) and b) one or more fully aliphatic polyamides (B) described herein and an overmolding polyamide resin composition being made of one or more polyamides, preferably semi-aromatic polyamides.

The matrix resin composition is made of a thermoplastic resin that is compatible with the surface polyamide resin composition, preferably, the matrix resin composition is made of one or more polyamides or is selected from the polyamide compositions comprising the blend of a) one or more semi-aromatic polyamides (A) and b) one or more fully aliphatic polyamides (B) as described above Polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic and are described hereafter.

The term "semi-aromatic" describes polyamides that comprise at least some monomers containing aromatic groups, in comparison with "fully aliphatic" polyamide which describes polyamides comprising aliphatic carboxylic acid monomer(s) and aliphatic diamine monomer(s).

The one or more semi-aromatic polyamides (A) may be derived from one or more aliphatic carboxylic acid components and aromatic diamine components such as for example m-xylylenediamine and p-xylylenediamine, may derived be from one or more aromatic carboxylic acid components and one or more diamine components or may be derived from carboxylic acid components and diamine components.

Preferably, the one or more semi-aromatic polyamides (A) are formed from one or more aromatic carboxylic acid components and one or more diamine components. The one or more aromatic carboxylic acids can be terephthalic acid or mixtures of terephthalic acid and one or more other carboxylic acids, like isophthalic acid, substituted phthalic acid such as for example 2-methylterephthalic acid and unsubstituted or substituted isomers of naphthalenedicarboxylic acid, wherein the carboxylic acid component contains at least 55 mole-% of terephthalic acid (the mole-% being based on the carboxylic acid mixture). Preferably, the one or more aromatic carboxylic acids are selected from terephthalic acid, isophthalic acid and mixtures thereof and more preferably, the one or more carboxylic acids are mixtures of terephthalic acid and isophthalic acid, wherein the mixture contains at least 55 mole-% of terephthalic acid. More preferably, the one or more carboxylic acids is 100% terephthalic acid. Furthermore, the one or more carboxylic acids can be mixed with one or more aliphatic carboxylic acids, like adipic acid; pimelic acid; suberic acid; azelaic acid; sebacic acid and dodecanedioic acid, adipic acid being preferred. More preferably the mixture of terephthalic acid and adipic acid comprised in the one or more carboxylic acids mixtures of the one or more semi-aromatic polyamide (A) contains at least 55 mole-% of terephthalic acid. The one or more semi-aromatic polyamides (A) described herein comprises one or more diamines that can be chosen among diamines having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylene diamine; trimethylhexamethylene diamine, bis(p-aminocyclohexyl)methane; and/or mixtures thereof. Preferably, the one or more diamines of the one or more semi-aromatic polyamides (A) described herein are selected from hexamethylene diamine, 2-methyl pentamethylene diamine and mixtures thereof, and more preferably the one or more diamines of the one or more semi-aromatic polyamides (A) are selected from hexamethylene diamine and mixtures of hexamethylene diamine and 2-methyl pentamethylene diamine wherein the mixture contains at least 50 mole-% of hexamethylene diamine (the mole-% being based on the diamines mixture). Examples of semi-aromatic polyamides (A) useful in the polyamide composition described herein are commercially available under the trademark Zytel® HTN from E. I. du Pont de Nemours and Company, Wilmington, Del.

The one or more fully aliphatic polyamides (B) are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams include caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used. Carboxylic acid monomers comprised in the fully aliphatic polyamides are aliphatic carboxylic acids, such as for example adipic acid (C6), pimelic acid (C7), suberic acid (C8), azelaic acid (C9), sebacic acid (C10), dodecanedioic acid (C12) and tetradecanedioic acid (C14). Preferably, the aliphatic dicarboxylic acids of the one or more fully aliphatic polyamides (B) are selected from adipic acid and dodecanedioic acid. The one or more fully aliphatic polyamides (B) described herein comprise an aliphatic diamine as previously described. Preferably, the one or more diamine monomers of the one or more fully aliphatic polyamide copolymer (B) according to the present invention are selected from tetramethylene diamine and hexamethylene diamine. Suitable examples fully aliphatic polyamides include polyamide 6; polyamide 6,6; polyamide 4,6; polyamide 6,10; polyamide 6,12; polyamide 6,14; polyamide 6,13; polyamide 6,15; polyamide 6,16; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14. Preferred examples of fully aliphatic polyamides (B) useful in the polyamide composition of the present invention are poly(hexamethylene adipamide) (polyamide 66, PA66, also called nylon 66), poly(hexamethylene dodecanoamide) (polyamide 612, PA612, also called nylon 612) and are commercially available under the trademark Zytel® from E. I. du Pont de Nemours and Company, Wilmington, Del.

The surface polyamide resin composition and/or the matrix resin composition and/or the overmolding resin composition may further comprise one or more impact modifiers, one or more heat stabilizers, one or more oxidative stabilizers, one or more reinforcing agents, one or more ultraviolet light stabilizers, one or more flame retardant agents or mixtures thereof.

The surface polyamide resin composition and/or the matrix resin composition and/or the overmolding resin composition may further comprise one or more heat stabilizers. The one or more heat stabilizers are preferably selected from copper salts and/or derivatives thereof, hindered amine antioxidants, phosphorus antioxidants and mixtures thereof and more preferably from copper salts and/or derivatives combined with a halide compound, from hindered phenol antioxidants, hindered amine antioxidants, phosphorus antioxidants and mixtures thereof. Examples of copper salts and/or derivatives thereof include without limitation copper halides or copper acetates; divalent manganese salts and/or derivatives thereof and mixtures thereof. Preferably, copper salts and/or derivatives are used in combination with halide compounds and/or phosphorus compounds and more preferably copper salts are used in combination with iodide or bromide compounds, and still more preferably, with potassium iodide or potassium bromide. When present, the one or more heat stabilizers are present in an amount from at or about 0.1 to at or about 3 wt-%, or preferably from at or about 0.1 to at or about 1 wt-%, or more preferably from at or about 0.1 to at or about 0.7 wt-%, the weight percentage being based on the total weight of the surface resin composition or the matrix resin composition or the overmolding resin composition, as the case may be. The addition of the one or more heat stabilizers further improves the thermal stability of the first component and the overmolded composite structure and during their manufacture as well as their thermal stability upon use and time. In addition to the improved heat stability, the presence of the one or more heat stabilizers may allow an increase of the temperature that is used during the impregnation of the first component thus reducing the melt viscosity of the matrix resin and/or the polyamide composition described herein. As a consequence of a reduced melt viscosity of the matrix resin and/or the polyamide surface resin composition, impregnation rate may be increased.

The surface polyamide resin composition and/or the matrix resin composition and/or the overmolding resin composition may further contain one or more oxidative stabilizers such as for example phosphorus antioxidants (e.g. phosphite or phosphonite stabilizers), hindered phenol stabilizers, aromatic amine stabilizers, thioesters, and phenolic based anti-oxidants that hinder thermally induced oxidation of polymers where high temperature applications are used. When present, the one or more oxidative stabilizers comprise from at or about 0.1 to at or about 3 wt-%, or preferably from at or about 0.1 to at or about 1 wt-%, or more preferably from at or about 0.1 to at or about 0.7 wt-%, the weight percentage being based on the total weight of the surface resin composition or the matrix resin composition or the overmolding resin composition, as the case may be.

The surface polyamide resin composition and/or the matrix resin composition and/or the overmolding resin composition may further contain one or more reinforcing agents such as glass fibers, glass flakes, carbon fibers, mica, wollastonite, calcium carbonate, talc, calcined clay, kaolin, magnesium sulfate, magnesium silicate, barium sulfate, titanium dioxide, sodium aluminum carbonate, barium ferrite, and potassium titanate. When present, the one or more reinforcing agents are present in an amount from at or about 1 to at or about 60 wt-%, preferably from at or about 1 to at or about 40 wt-%, or more preferably from at or about 1 to at or about 35 wt-%, the weight percentages being based on the total weight of the surface resin composition or the matrix resin composition or the overmolding resin composition, as the case may be.

The surface polyamide resin composition and/or the matrix resin composition and/or the overmolding resin composition may further contain one or more ultraviolet light stabilizers such as hindered amine light stabilizers (HALS), carbon black, substituted resorcinols, salicylates, benzotriazoles, and benzophenones.

The surface polyamide resin composition and/or the matrix resin composition and/or the overmolding resin composition may further contain one or more flame retardant agents such as metal oxides (wherein the metal may be aluminum, iron, titanium, manganese, magnesium, zirconium, zinc, molybdenum, cobalt, bismuth, chromium, tin, antimony, nickel, copper and tungsten), metal powders (wherein the metal may be aluminum, iron, titanium, manganese, zinc, molybdenum, cobalt, bismuth, chromium, tin, antimony, nickel, copper and tungsten), metal salts such as zinc borate, zinc metaborate, barium metaborate, zinc carbonate, magnesium carbonate, calcium carbonate and barium carbonate, metal phosphinates (wherein the metal may be aluminum, zinc and calcium), halogenated organic compounds like decabromodiphenyl ether, halogenated polymer such as poly(bromostyrene) and brominated polystyrene, melamine pyrophosphate, melamine cyanurate, melamine polyphosphate, red phosphorus, and the like.

The surface polyamide resin composition and/or the matrix resin composition and/or the overmolding resin composition may further include modifiers and other ingredients, including, without limitation, flow enhancing additives, lubricants, antistatic agents, coloring agents (including dyes, pigments, carbon black, and the like), flame retardants, nucleating agents, crystallization promoting agents and other processing aids known in the polymer compounding art.

Fillers, modifiers and other ingredients described above may be present in amounts and in forms well known in the art, including in the form of so-called nano-materials where at least one of the dimensions of the particles is in the range of 1 to 1000 nm.

Preferably, the surface polyamide resin composition and/or the matrix resin composition and/or the overmolding resin composition are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The overmolded composite structure according to the present invention may be manufactured by a process comprising a step of overmolding the first component described above with the overmolding resin composition. By "overmolding", it is meant that a second component comprising the overmolding resin composition described herein is molded or extruded onto at least one portion of the surface of the first component, which surface is made of a surface polyamide resin composition.

The overmolding process includes that the second component is molded in a mold already containing the first component, the latter having been manufactured beforehand as described hereafter, so that the first and second components are adhered to each other over at least a portion of the surface of the first component. The first component is positioned in a mold having a cavity defining the outer surface of the final overmolded composite structure. The overmolding resin composition may be overmolded on one side or on both sides of the first component and it may fully or partially encapsulate the first component. After having positioned the first component in mold, the overmolding resin composition is then introduced in a molten form. The first component and the second component are adhered together by overmolding. The at least two parts are preferably adhered together by injection or compression molding as an overmolding step, and more preferably by injection molding. When the overmolding resin composition is introduced in a molten form in the molding station so as to be in contact with the first component, at least a thin layer of an element of the first component is melted and becomes intermixed with the overmolding resin composition.

While it is conventional to preheat the first component at a temperature close to but below the melt temperature of the matrix resin composition prior to the overmolding step so as to improve the adhesion between the surface of the first component and the overmolding resin and then to rapidly transfer the heated composite structure for overmolding; such a step can be improved or even eliminated by using the overmolding resin composition and the surface polyamide resin composition. Due to the high adhesion and high bond strength between the overmolding resin and the surface polyamide resin composition of the overmolded composite structure according to the present invention, the need for a preheating step is strongly reduced or even eliminated. Should a preheating step be used, the transfer time may not be as critical as for conventional composite structures, meaning that the transfer time may be increased thereby increasing the processing window and reducing molding equipment and automation costs.

The first component can be made by a process that comprises a step of impregnating the fibrous material with the matrix resin composition, wherein at least a portion of the surface of the first component is made of the surface polyamide resin composition.

Preferably, the fibrous material is impregnated with the matrix resin by thermopressing. During thermopressing, the fibrous material, the matrix resin composition and the surface polyamide resin composition undergo heat and pressure in order to allow the plastics to melt and penetrate through the fibrous material and, therefore, to impregnate said fibrous material. Typically, thermopressing is made at a pressure between 2 and 100 bars and more preferably between 10 and 40 bars and a temperature which is above the melting point of the matrix resin composition and the surface polyamide resin composition, preferably at least about 20° C. above the melting point to enable a proper impregnation. Heating may be done by a variety of means, including contact heating, radiant gas heating, infra red heating, convection or forced convection, induction heating, microwave heating or combinations thereof. The driving impregnation pressure can be applied by a static process or by a continuous process (also known as dynamic process), a continuous process being preferred for reasons of speed. Examples of impregnation processes include without limitation vacuum molding, in-mold coating, cross-die extrusion, pultrusion, wire coating type processes, lamination, stamping, diaphragm forming or press-molding, lamination being preferred. During lamination, heat and pressure are applied to the fibrous material, the matrix resin composition and the surface polyamide resin composition through opposing pressured rollers or belts in a heating zone, preferably followed by the continued application of pressure in a cooling zone to finalize consolidation and cool the impregnated fibrous material by pressurized means. Examples of lamination techniques include without limitation calendering, flatbed lamination and double-belt press lamination. When lamination is used as the impregnating process, preferably a double-belt press is used for lamination. Also described herein are processes for making the first components, i.e. the composite structures, described above, wherein the processes comprise a step of applying a surface resin composition to at least a portion of the surface of the fibrous material which is impregnated with the matrix resin composition described herein.

With the aim of increasing the impregnation rate of the fibrous material, the melt viscosity of the matrix resin composition may be reduced. In general, it is an advantage to have a flow rate of material as high as possible to make the most efficient use of the processing machine and thereby reduce costs by increasing the impregnation rate of the fibrous material. For this reason, highly flowable polymer compositions in molten state are of interest. By having a low melt viscosity, highly flowable polymer compositions flow faster and are thus easier to be processed. By reducing the melt viscosity of the matrix resin composition, the rate of the impregnation step may be shortened thereby increasing the overall manufacturing speed and thus leading to an increased productivity of the manufacture of the composite structures and a decrease of energy consumption associated with a shorter cycle time that is beneficial also for environmental concerns. In addition to the improved throughput, the increased impregnation rates also minimize the thermal degradation of the polymer composition. With the aim of reducing the melt viscosity of the matrix resin composition, the matrix resin composition may further comprise one or more rheology modifiers selected from hyperbranched dendrimers and more preferably one or more hyperbranched polyester dendrimers. Preferred examples of hyperbranched dendrimers are those described in U.S. Pat. No. 5,418,301 US 2007/0173617. The use of such dendrimers in thermoplastic resins is disclosed in U.S. Pat. Nos. 6,225,404, 6,497,959, 6,663,966, WO 2003/004546, EP 1424360 and WO 2004/111126. This literature teaches that the addition of hyperbranched dendritic polyester macromolecules to thermoplastic compositions leads to improved rheological and mechanical properties due to the reduction of the melt viscosity of the composition and, therefore, lead to an improved processability of the thermoplastic composition. When present, the one or more hyperbranched dendrimers comprise from at or about 0.05 to at or about 10 wt-%, or more preferably from at or about 0.1 to at or about 5 wt-%, the weight percentage being based on the total weight of the matrix resin composition. With the aim of reducing the melt viscosity of the matrix resin composition so as to improve the impregnation rate of the first component, i.e. the composite structure, the matrix resin composition may further comprise one or more molecular chain breaking agents. Examples of molecular chain breaking agents include without limitation aliphatic dicarboxylic acids and aromatic dicarboxylic acids. Specific examples thereof are oxalic acid, malonic acid, succinic acid, adipic acid, azelaic acid, sebacic acid, dodecanedioic acid, isomers of phthalic acid. When present, the one ore more molecular chain breaking agents comprise from at or about 0.05 to at or about 5 wt-%, or more preferably from at or about 0.1 to at or about 3 wt-%, the weight percentage being based on the total weight of the matrix resin composition.

The matrix resin composition and the surface polyamide resin composition are applied to the fibrous material by conventional means such as for example powder coating, film lamination, extrusion coating or a combination of two or more thereof, provided that the surface polyamide resin composition is applied on at least a portion of the surface of the first component, i.e. the composite structure, so as to be accessible when an overmolding resin is applied onto the first component.

During a powder coating process, a polymer powder which has been obtained by conventional grinding methods is applied to the fibrous material. The powder may be applied onto the fibrous material by scattering, sprinkling, spraying, thermal or flame spraying, or fluidized bed coating methods. Optionally, the powder coating process may further comprise a step which consists in a post sintering step of the powder on the fibrous material. The matrix resin composition and the surface polyamide resin composition are applied to the fibrous material such that at least of portion of surface of the composite structure is made of the polyamide surface resin composition. Subsequently, thermopressing is achieved on the powder coated fibrous material, with an optional preheating of the powdered fibrous material outside of the pressurized zone.

During film lamination, one or more films made of the matrix resin composition and one or more films made of the surface polyamide resin composition which have been obtained by conventional extrusion methods known in the art such as for example blow film extrusion, cast film extrusion and cast sheet extrusion are applied to the fibrous material, e.g. by layering. Subsequently, thermopressing is performed on the assembly comprising the one or more films made of the matrix resin composition and the one or more films made of the surface polyamide resin composition and the one or more fibrous materials. In the resulting first component, the films melt and penetrate around the fibrous material as a polymer continuum surrounding the fibrous material.

During extrusion coating, pellets and/or granulates made of the matrix resin composition and pellets and/or granulates made of the surface polyamide resin composition are extruded through one or more flat dies so as to form one or more melt curtains which are then applied onto the fibrous material by laying down the one or more melt curtains. Subsequently, thermopressing is performed on the assembly comprising the matrix resin composition, the surface resin composition and the one or more fibrous materials.

Depending on the end-use application, the first component may be shaped into a desired geometry or configuration, or used in sheet form prior to the step of overmolding the overmolding resin composition. The first component may be flexible, in which case it can be rolled.

The process for making a shaped first component further comprises a step of shaping the first component, said step arising after the impregnating step. The step of shaping the first component may be done by compression molding, stamping or any technique using heat and/or pressure, compression molding and stamping being preferred. Preferably, pressure is applied by using a hydraulic molding press. During compression molding or stamping, the first component is preheated to a temperature above the melt temperature of the surface resin composition and preferably above the melt temperature of the matrix resin composition by heated means and is transferred to a forming or shaping means such as a molding press containing a mold having a cavity of the shape of the final desired geometry whereby it is shaped into a desired configuration and is thereafter removed from the press or the mold after cooling to a temperature below the melt temperature of the surface polyamide resin composition and preferably below the melt temperature of the matrix resin composition.

With the aim of improving the adhesion between the overmolding resin and the polyamide surface resin composition, the surface of the composite structure may be a textured surface so as to increase the relative surface available for overmolding. Such textured surface may be obtained during the step of shaping by using a press or a mold having for example porosities or indentations on its surface.

Alternatively, a one step process comprising the steps of shaping and overmolding the first component in a single molding station may be used. This one step process avoids the step of compression molding or stamping the first component in a mold or a press, avoids the optional preheating step and the transfer of the preheated first component to the molding station. During this one step process, the first component, i.e. the composite structure, is heated outside, adjacent to or within the molding station, to a temperature at which the first component is conformable or shapeable during the overmolding step, and preferably it is heated to a temperature below the melt temperature of the composite structure. In such a one step process, the molding station comprises a mold having a cavity of the shape of the final desired geometry. The shape of the first component is thereby obtained during overmolding.

Also described herein are uses of the one or more fully aliphatic polyamides (B) selected from the group consisting of polyamides containing repeat units derived from aliphatic dicarboxylic acids and aliphatic diamines, polyamides containing repeat units derived from aliphatic aminocarboxylic acids, and polyamides derived from lactams described herein in a polyamide composition comprising the one or more semi-aromatic polyamides (A) described herein for increasing the adhesion between a first component having a surface and a second component of an overmolded composite structure, wherein the second component is adhered to said first component over at least a portion of the surface of said first component, wherein the surface of the first component has at least a portion made of a surface polyamide resin composition, and comprises a fibrous material selected from non-woven structures, textiles, fibrous battings and combinations thereof such as those described above, said fibrous material being impregnated with a matrix resin composition, wherein the second component comprises an overmolding resin composition, wherein one of the overmolding resin composition and the surface polyamide resin composition is made of the polyamide composition comprising the one or more semi-aromatic polyamides (A) described above, and wherein the other of the overmolding resin composition and the surface polyamide resin composition is made of one or more polyamides.

The overmolded composite structures according to the present invention may be used in a wide variety of applications such as for example as components for automobiles, trucks, commercial airplanes, aerospace, rail, household appliances, computer hardware, hand held devices, recreation and sports, structural component for machines, structural components for buildings, structural components for photovoltaic equipments or structural components for mechanical devices.

Examples of automotive applications include without limitation seating components and seating frames, engine cover brackets, engine cradles, suspension cradles, spare tire wells, chassis reinforcement, floor pans, front-end modules, steering column frames, instrument panels, door systems, body panels (such as horizontal body panels and door panels), tailgates, hardtop frame structures, convertible top frame structures, roofing structures, engine covers, housings for transmission and power delivery components, oil pans, airbag housing canisters, automotive interior impact structures, engine support brackets, cross car beams, bumper beams, pedestrian safety beams, firewalls, rear parcel shelves, cross vehicle bulkheads, pressure vessels such as refrigerant bottles and fire extinguishers and truck compressed air brake system vessels, hybrid internal combustion/electric or electric vehicle battery trays, automotive suspension wishbone and control arms, suspension stabilizer links, leaf springs, vehicle wheels, recreational vehicle and motorcycle swing arms, fenders, roofing frames and tank flaps.

Examples of household appliances include without limitation washers, dryers, refrigerators, air conditioning and heating. Examples of recreation and sports include without limitation inline-skate components, baseball bats, hockey sticks, ski and snowboard bindings, rucksack backs and frames, and bicycle frames. Examples of structural components for machines include electrical/electronic parts such as for example housings for hand held electronic devices, computers.

EXAMPLES

The following materials were used for preparing the overmolded composite structures according to the present invention and comparative examples.

Materials

The materials below make up the compositions used in the Examples and Comparative Examples Fully aliphatic polyamide (PA): polyamide made of adipic acid and 1,6-hexamethylenediamine, this polymer is called PA6,6 and is commercially available, for example, from E. I. du Pont de Nemours and Company .

Semi-aromatic polyamide (PA): polyamide made of terephthalic acid and 1,6-hexamethylenediamine (HMD) and 2-methylpentamethylenediamine (MPMD) (HMD: MPMD=50:50). This semi-aromatic polyamide is commercially available, for example, from E. I. du Pont de Nemours.

Preparation of the First Components (Composite Structures)

Surface films having a thickness of about 200 micrometers and made of the surface polyamide resin compositions listed in Table 1 were applied to laminates comprising a matrix resin composition made of PA6,6 and a glass fabric (woven continuous glass fibers) having a thickness of about 1.5 mm (supplied by Hexcel) by compression molding.

The surface films comprising the surface polyamide resin compositions were made with a 28mm W&P extruder with an adaptor and film die and an oil heated casting drum. The extruder and adaptor and die temperatures were set at 280° C. for Comparative example 1 (C1) and 320° C. for comparative example 2 (C2), Example 1 (E1) and Example 2 (E2). The temperature of the casting drum was set at 100° C. for Comparative example 1 (C1) and 150° C. for comparative example 2 (C2), Example 1 (E1) and Example 2 (E2).

Surface films were applied onto the laminates. The composite structures were formed by compression molding the films by a Dake Press (Grand Haven, Mich) Model 44-225 (pressure range 0-25K) with an 8 inch platten. A 3×6" specimen of the laminate was placed in the mold and the film was pressed onto the laminate's surface at a temperature of about 330° C. and with a pressure of about 3 KPsi for about 2 minutes, and with a pressure of about 6 Kpsi for about an 3 additional minutes and subsequently cooled to room temperature.

The composite structures comprising a surface made of the surface polyamide resin compositions listed in Table 1, the matrix resin compositions listed in Table 1 and the fibrous material had an overall thickness of about 1.5 mm.

Preparation of the Overmolded Composite Structures

The overmolded composite structures in Table 1 were made by over injection molding about 1.5 mm of the overmolding resin compositions listed in Table 1 onto the composite structures obtained as described above.

The composite structures comprising a surface made of the surface polyamide resin compositions listed in Table 1, the matrix resin compositions listed in Table 1 and the fibrous material obtained as described above were cut into 3×5" specimens and placed into a mold cavity as inserts and were over injection molded with the overmolding resin compositions listed in Table 1 by a molding machine (Nissei Corp., Model FN4000, 1752 KN, 148 cc (6 oz.)). The mold was electrically heated at 150° C. and fitted with a ⅛"×3"×5" plaque cavity with a bar gate. As mentioned in Table 1, before the over injection molding step, the composite structures were either preheated at 200° C. for 15 minutes or at room temperature. The composite structures were inserted manually either at room temperature or preheated in a Hotpack oven Model 273601 set at 200° C. The injection machine was set at 280° C. for comparative example 1 (C1), 320° C. for comparative example 2 (C2) and Example 2 (E2), and 310° C. for Example 1 (E1).

Bond Strength

The overmolded composite structures obtained as described above were cut ½" wide by 2½" long tests specimens using a MK-377 Tile Saw with a diamond edged blade and water as a lubricant.

Bond strength was tested on the test specimens via a 4 point bend method. Four point bend method was used to characterize adhesion/bond strength of the overmolded resin composition to the composite structure. The four point bend apparatus bent the specimen by supporting the beam on the tensile side (outer span) while indenting with two supports on the compression side (inner span). The ratio of the outer span to the specimen depth was 16:1. The ratio of the outer span to the inner span was 3:1. The distance between the outer span and inner span supports was ⅓ of the outer span. The tests were conducted at 2.5 mm/min using an MTS universal test machine.

Beam specimens (12.6 mm×76 mm) were machined from plaques. The overmolded layers of the beams were notched prior to testing by using a handsaw to cut through approximately 95% of the depth of the overmolded layer. A fresh razor blade was used to sharpen the prenotch by sliding it across the prenotch.

The notched side of the specimen is placed on the outer span supports and the laminate is loaded by the two supports of the inner span. The resulting load-displacement curve exhibit a peak, drops sharply, and exhibits a plateau which corresponds to the adhesion load.

Table 1 gives average values obtained from five specimens.

TABLE 1

Resin compositions used for preparing the composite structures and overmolded composite structures according to the present invention (E1 and E2) and comparative examples (C1 and C2) and bond strength of the overmolded composite structures.

|  | C1 | C2 | E1 | E2 |
|---|---|---|---|---|
| Surface polyamide resin composition | fully aliphatic PA | semi-aromatic PA | semi-aromatic PA | blend of: 50 wt-% of fully aliphatic PA, and 50 wt-% of semi-aromatic PA |
| Matrix resin composition | fully aliphatic PA | fully aliphatic PA | fully aliphatic PA | fully aliphatic PA |
| Overmolding resin composition | fully aliphatic PA | semi-aromatic PA | blend of: 40 wt-% of fully aliphatic PA, and 60 wt-% of semi-aromatic PA | semi-aromatic PA |
| Bond strength/N (without a pre-heating of the first component) | 0 | 33 | 71 | 66 |
| Bond strength/N (with a pre-heating of the first component at 200° C.) | 0 | 40 | 91 | 71 |

As shown in Table 1 for the comparative example 1 (C1), the adhesion between an overmolded component comprising an overmolding resin composition made of a fully aliphatic polyamide PA6,6 and a composite component having a surface made of a fully aliphatic polyamide PA6,6, was so low that the two components did not stick together.

As shown in Table 1 for the comparative example 2 (C2), the adhesion between an overmolded component comprising an overmolding resin composition made of a semi-aromatic polyamide and a composite component having a surface made of a semi-aromatic polyamide was poor, with bond strength values of 40 N when the first component was pre-heated at 200° C. before the overmolding step and values of 33 N when no pre-heating step was used.

In contrast, the adhesion the examples according to the present invention (E1) between an overmolded component comprising an overmolding resin composition comprising a blend of a fully aliphatic polyamide PA6,6 and a semi-aromatic polyamide and a composite component having a surface made of a surface resin composition comprising a semi-aromatic polyamide was higher than the comparative examples. The examples according to the present invention (E1) exhibited bond strength values of 91 N when the composite component was pre-heated at 200° C. before the overmolding step and values of 71 N when no pre-heating step was done. The adhesion the examples according to the present invention (E2) between an overmolded component comprising a semi-aromatic polyamide and a composite component having a surface made of a surface resin composition comprising a blend of a fully aliphatic polyamide PA6,6 and a semi-aromatic polyamide and a composite component having a surface made of a surface resin composition comprising a semi-aromatic polyamide was higher than the comparative examples. The examples according to the present invention (E2) exhibited bond strength values of 71 N when the composite component was pre-heated at 200° C. before the overmolding step and values of 66 N when no pre-heating step was done.

What is claimed is:

1. An overmolded composite structure comprising:
    i) a first component having a surface, which surface has at least a portion made of a surface polyamide resin composition, and comprising a fibrous material selected from non-woven structures, textiles, fibrous battings and combinations thereof, said fibrous material being impregnated with a matrix resin composition by thermo-pressing,
    ii) a second component comprising an overmolding resin composition, wherein one of the overmolding resin composition and the surface polyamide resin composition is made of a polyamide composition comprising a blend of:
        a) one or more semi-aromatic polyamides (A) containing repeat units derived from aromatic dicarboxylic acids and aliphatic diamines, and
        b) one or more fully aliphatic polyamides (B) selected from the group consisting of polyamides containing repeat units derived from aliphatic dicarboxylic acids and aliphatic diamines, polyamides containing repeat units derived from aliphatic aminocarboxylic acids, and polyamides derived from lactams,
    wherein the other of the overmolding resin composition and the surface polyamide resin composition is made of one or more polyamides,
    wherein the first component comprises from 30% to 60% fibrous material, the percentage being a volume-percentage based on the total volume of the first component, and wherein said second component is adhered to said first component over at least a portion of the surface of said first component.

2. The overmolded composite structure of claim 1, wherein the fibrous material is made of glass fibers, carbon fibers, aramid fibers, natural fibers or mixtures thereof.

3. The overmolded composite structure of claim 2, wherein the fibrous material is made of glass fibers.

4. The overmolded composite structure of any preceding claim, wherein the matrix resin composition is made of one or more polyamides or is made of a polyamide composition comprising a blend of:
    a) one or more semi-aromatic polyamides (A) containing repeat units derived from aromatic dicarboxylic acids and aliphatic diamines, and
    b) one or more fully aliphatic polyamides (B) selected from the group consisting of polyamides containing repeat units derived from aliphatic dicarboxylic acids and aliphatic diamines, polyamides containing repeat units derived from aliphatic aminocarboxylic acids, and polyamides derived from lactams.

5. The overmolded composite structure of claim 1, wherein the weight ratio of the one or more semi-aromatic polyamides (A) and the one or more fully aliphatic polyamides (B) (A:B) of the polyamide composition is between from about 99:1 to about 5:95.

6. The overmolded composite structure of claim 1, wherein the dicarboxylic acids of the one or more semi-aromatic polyamides (A) are selected from terephthalic acid, isophthalic acid and mixtures thereof.

7. The overmolded composite structure of claim 1, wherein the aliphatic diamines comprised in the one or more semi-aromatic polyamides (A) are selected from hexamethylene diamine, 2-methylpentamethylene diamine and mixtures thereof.

8. The overmolded composite structure of claim 1, wherein the matrix resin composition and/or the surface polyamide resin composition and/or the overmolding resin composition further comprise one or more impact modifiers, one or more heat stabilizers, one or more oxidative stabilizers, reinforcing agents, one or more ultraviolet light stabilizers, one or more flame retardant agents, or mixtures thereof.

9. The overmolded composite structure of claim 1, wherein the first component has the form of a sheet structure.

10. The overmolded composite structure of claim 1, in the form of a component for automobiles, trucks, commercial airplanes, aerospace, rail, household appliances, computer hardware, recreation and sports, structural component for machines, structural components for buildings, structural components for photovoltaic equipments or structural components for mechanical devices.

11. A process for making an overmolded composite structure comprising a step of overmolding the first component recited in claim 1 with an overmolding resin composition, wherein one of the overmolding resin composition and the surface polyamide resin composition is made of a polyamide composition comprising a blend of:
   a) one or more semi-aromatic polyamides (A) containing repeat units derived from aromatic dicarboxylic acids and aliphatic diamines, and
   b) one or more fully aliphatic polyamides (B) selected from the group consisting of polyamides containing repeat units derived from aliphatic dicarboxylic acids and aliphatic diamines, polyamides containing repeat units derived from aliphatic aminocarboxylic acids, and polyamides derived from lactams, and wherein the other of the overmolding resin composition and the surface polyamide resin composition is made of one or more polyamide.

* * * * *